(No Model.)
W. ANDRUS.
FEED TROUGH.
No. 408,569. Patented Aug. 6, 1889.
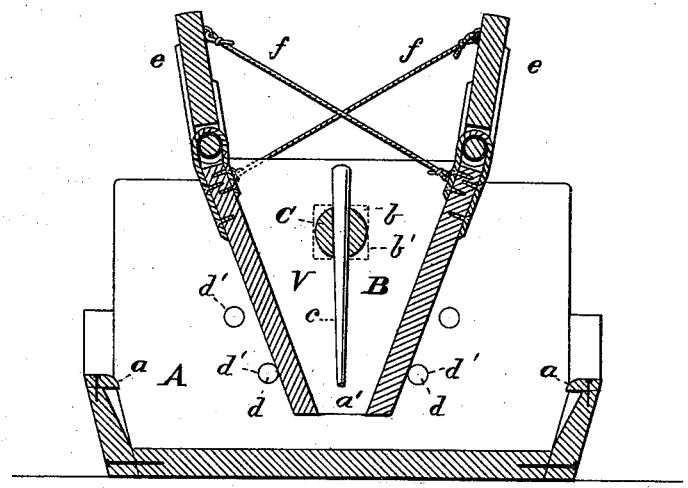
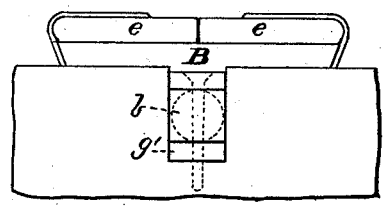
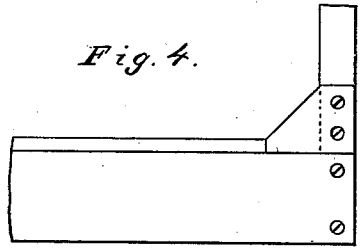
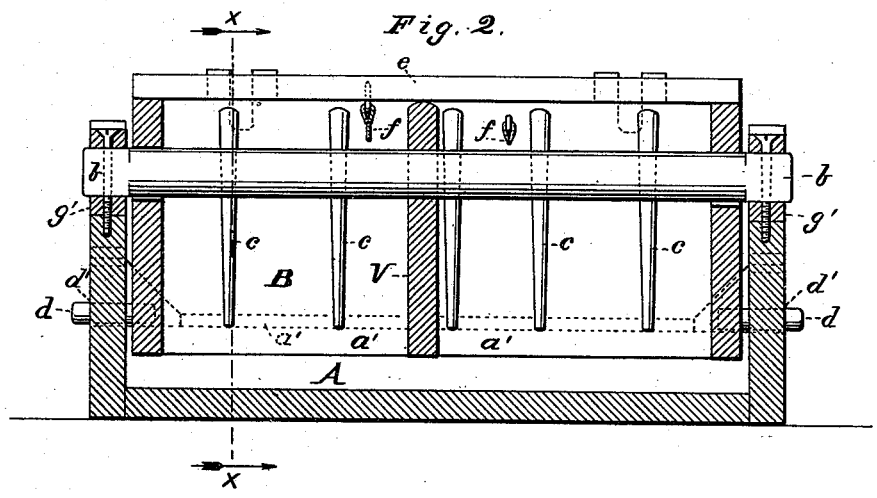
WITNESSES:
Villette Anderson,
Mary Boykin
INVENTOR
William Andrus
BY
E. W. Anderson
ATTORNEY

UNITED STATES PATENT OFFICE.

WILLIAM ANDRUS, OF REEDSBURG, WISCONSIN.

FEED-TROUGH.

SPECIFICATION forming part of Letters Patent No. 408,569, dated August 6, 1889.

Application filed March 26, 1889. Serial No. 304,798. (No model.)

*To all whom it may concern:*

Be it known that I, WILLIAM ANDRUS, a citizen of the United States, and a resident of Reedsburg, in the county of Sauk and State of Wisconsin, have invented certain new and useful Improvements in Feed-Troughs; and I do declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 1 of the drawings is a representation of this invention, and is a section taken where the broken line is marked on Fig. 2. Fig. 2 is a longitudinal section. Fig. 3 is a detail and an end view. Fig. 4 is a detail and front view.

This invention pertains to certain improvements in feed-troughs; and it consists of the novel construction and combination of parts, as hereinafter set forth, and pointed out in the appended claims.

In the embodiment of my invention I employ a receptacle or trough proper, which is indicated at A. The top edges of the front sides of the trough A are designed to be armed with slightly-inward-projecting hard pieces $a\ a$, which protect the same and prevent the spilling of the contents of the trough over these edges.

B is a hopper or bin, in which the food is directly placed and from which it is fed into the trough or receptacle A, the bin having a longitudinal feed slot or opening $a'$ in its contracted bottom. Through this bin or hopper passes a stationary shaft-like rod or bar C, having rectangular or squared ends $b\ b$, let into angular openings or recesses $b\ b'$ in the top edges of the ends of the trough A, and by means of which the hopper is suspended or hung in place in the trough, extending along the central portion thereof and forming the trough into compartments. The shaft-like bar or rod is provided with the removable vertical pins or agitator-fingers $c\ c$ to aid the proper flow or feeding of the contents of the hopper through its bottom opening into the trough. The principal feeding action, however, is effected by permitting the hopper to have a limited oscillatory movement as the animals are feeding, the same being communicated or transmitted to the hopper through the contact of the animal's head therewith. The bar C is therefore purposely made round or cylindrical in cross-section to form bearings for the pivot-openings in the hopper, the openings being of corresponding shape.

In order to vary or regulate the amount of oscillation or movement of the hopper according to the kind of feed passing through it into the trough, series of pin-apertures $d'$ $d'$ are used. If it is desired to lessen the oscillation of the hopper, pins $d$ are passed through the lower apertures $d'$ $d'$ in one or both ends of the trough. If the reverse is desired, the pins are placed in higher apertures. If it is desired to deprive the bin or hopper of all movement, the pins $d$ are placed in other apertures so arranged as to cause pins to bear against the hopper and hold it in position.

The hopper is preferably subdivided by transverse partitions, as at V, into two or more compartments, while the longitudinally-meeting half lids or covers $e\ e$, hinged to the top edges of the hopper, are limited, as they are raised, in their outward movement, being held slightly outward from a vertical position by check-cords $f\ f$. These are connected to opposite inner sides of the hopper or chest B and to the inner sides of the lids or covers.

The ends of the shaft or rod C are rendered vertically adjustable to vary the space between the hopper or bin B and the trough as may be desired by means of blocks $g\ g$ and set-screws $g'\ g'$, which blocks are designed to be shifted from below the shaft ends to a point above the same, or reversely, in making the adjustment.

Having described this invention, what I claim, and desire to secure by Letters Patent, is—

1. The feed-trough and its limiting-stops, in combination with the oscillatory hopper or bin, the shaft-like rod or bar forming a bearing for said hopper and having fingers extending downward in said hopper toward its discharge-opening, substantially as specified.

2. The feed-trough, in combination with the oscillatory hopper or bin, the vertically-adjustable shaft or rod upon which said hopper is suspended, and the agitator-fingers of said shaft or rod extending into said hopper, substantially as and for the purpose set forth.

In testimony whereof I affix my signature in presence of two witnesses.

WILLIAM ANDRUS.

Witnesses:
WILLIAM A. WYSE,
HORACE J. SMITH.